United States Patent [19]

Matuda et al.

[11] Patent Number: 5,418,915
[45] Date of Patent: May 23, 1995

[54] ARITHMETIC UNIT FOR SIMD TYPE PARALLEL COMPUTER

[75] Inventors: Motohiko Matuda, Amagasaki; Taiichi Yuasa, Toyohashi, both of Japan

[73] Assignee: Sumitomo Metal Industries, Ltd., Osaka, Japan

[21] Appl. No.: 251,651

[22] Filed: May 31, 1994

Related U.S. Application Data

[63] Continuation of Ser. No. 741,568, Aug. 7, 1991, abandoned.

[30] Foreign Application Priority Data

Aug. 8, 1990 [JP] Japan ................................. 2-211923
Sep. 29, 1990 [JP] Japan ................................. 2-262574

[51] Int. Cl.$^6$ ................ G06F 13/38; G06F 13/36; G06F 15/76
[52] U.S. Cl. ..................... 395/325; 395/800; 364/DIG. 1; 364/DIG. 2; 364/228.7; 364/229.2; 364/231.4; 364/231.9; 364/271.2; 364/931.42; 364/931.48; 364/931.03
[58] Field of Search ........................ 395/325, 800

[56] References Cited

U.S. PATENT DOCUMENTS

| | | | |
|---|---|---|---|
| 4,373,183 | 2/1983 | Means et al. | 395/325 |
| 4,835,729 | 5/1989 | Morton | 395/800 |
| 4,891,787 | 1/1990 | Gifford | 395/800 |
| 4,896,256 | 1/1990 | Robarts | 395/325 |
| 4,992,933 | 2/1991 | Taylor | 395/800 |
| 5,157,758 | 10/1992 | Jackson et al. | 395/800 |
| 5,179,714 | 1/1993 | Graybill | 395/800 |
| 5,206,937 | 4/1993 | Goto | 395/325 |
| 5,212,777 | 5/1993 | Gove et al. | 395/375 |
| 5,218,709 | 6/1993 | Fijany et al. | 395/800 |
| 5,305,462 | 4/1994 | Grondalski | 395/800 |
| 5,317,734 | 5/1994 | Gupta | 395/650 |
| 5,327,538 | 7/1994 | Hamaguchi et al. | 395/325 |
| 5,347,450 | 10/1994 | Nugert | 395/200 |

Primary Examiner—Robert B. Harrell
Assistant Examiner—Timothy L. Philipp
Attorney, Agent, or Firm—Burns, Doane, Swecker & Mathis

[57] ABSTRACT

In the SIMD parallel computer according to the present invention, the arithmetic unit has an instruction storage means for storing a local instruction, a selecting means for selecting any one of the common instruction and the local instruction stored in the instruction storage means, a selection control means for controlling a selecting operation of the selecting means and a means for executing the selected instruction. In an arrangement of the SIMD parallel computer of this invention is that each arithmetic part is connected to the memory via an address changeover circuit and a data changeover circuit as well. One arithmetic part is selectively connected to the memory under the selection control handled by the central control circuit. Further in the parallel computer according to the present invention for performing parallel processing of the data through communications between the plurality of processors arrayed in grids, each processor has output links extending two directions of a first diagonal line of the grid and also input links extending in two directions of a second diagonal line thereof. The output links are connected to input or output links of 3-neighbor processors. Provided is a communication circuit for selecting one of the bidirectional output links by 1 bit of a 2-bit direction signal given to establish the communication direction and one of the bidirectional input links by another 1-bit.

7 Claims, 15 Drawing Sheets

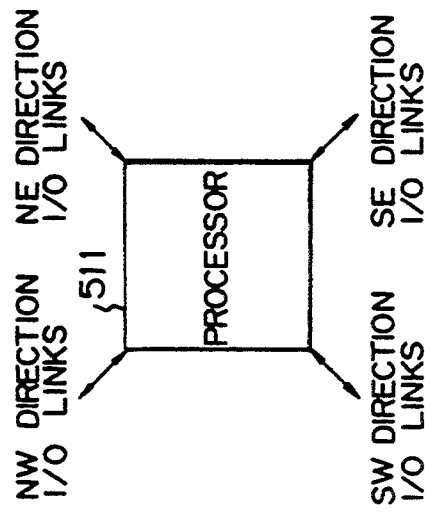
Fig. 15 PRIOR ART
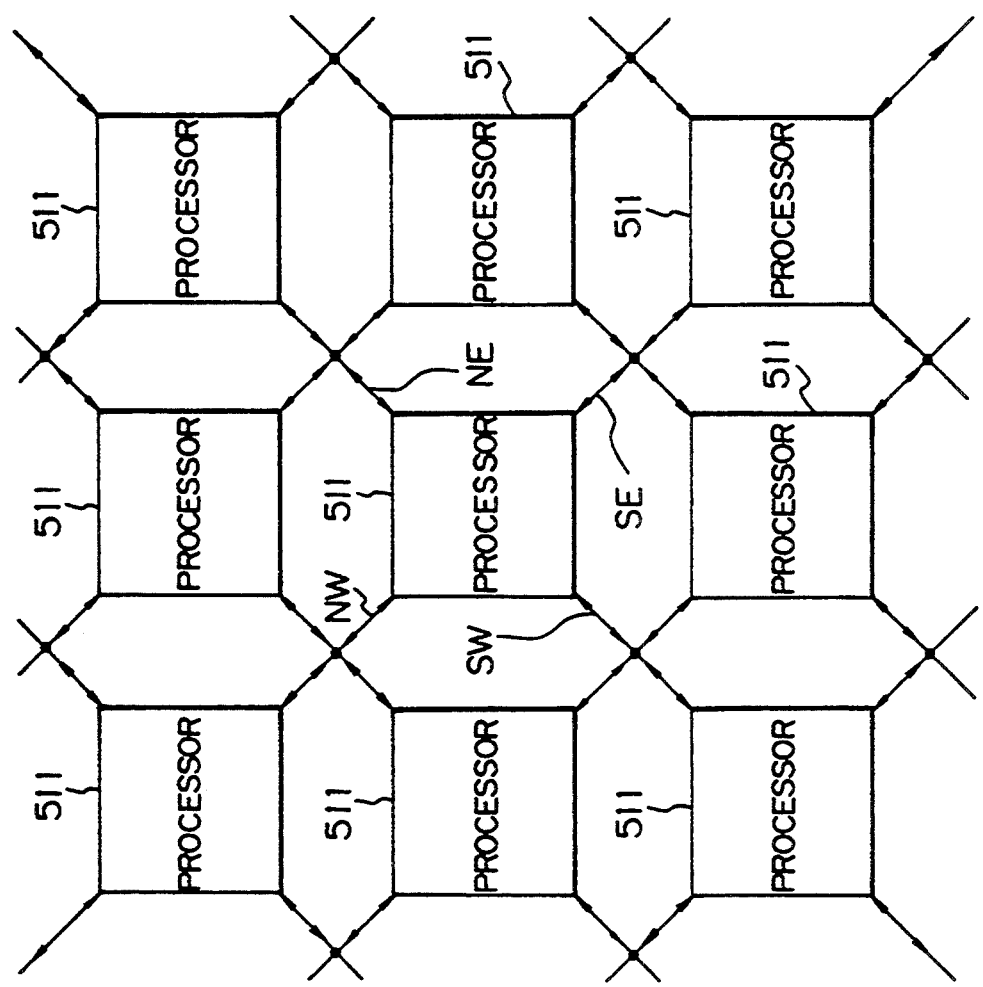

ARITHMETIC UNIT FOR SIMD TYPE PARALLEL COMPUTER

This application is a continuation of application Ser. No. 07/741,568, filed Aug. 7, 1991, now abandoned.

BACKGROUND OF THE INVENTION

The present invention relates to a parallel computer having a Single Instruction Stream/Multiple Data Stream (SIMD) architecture for executing a single instruction with respect to multiple data by use of a plurality of arithmetic units, and more particularly, to an architecture of processing elements (PEs) of the SIMD computer as well as to a communication connection network between the PEs.

A Multiple Instruction Stream/Multiple Data Stream (MIMD) architecture and a Single Instruction Stream/Multiple Data Stream (SIMD) architecture are taxonomically exemplified as typical architectures of parallel computers, especially of hyperparallel computers for executing parallel operations by arranging several hundreds to several ten thousands of arithmetic units in parallel.

The MIMD parallel computer is conceived as a parallel computer of a system such that a plurality of arithmetic units are each controlled by a string of particular instructions. Each arithmetic unit has a high independency, and hence a generality in purpose of the system is enhanced. Complicated parallel processing can therefore be performed. This type of parallel computer tends, however, to cause an increase in overhead for communications and synchronizations between the strings of instructions which are working in the respective arithmetic units; and the control is also liable to be complicated.

The SIMD parallel computer is conceived as a parallel computer of a system such that the plurality of arithmetic units are controlled by a single string of instructions. All the arithmetic units are synchronized and operated by the single string of instructions. Hence, control is simple, and there is no necessity for giving instructions to respective arithmetic units. Therefore, this type of parallel computer may be relatively easily scaled up and suited to such simple numeric processing and image processing that simple arithmetic operations are repeatedly applied to a large amount of data.

Because of the characteristics described above, the SIMD parallel computers are dominant as commercially available parallel computers which are now utilized. Connection Machine (CM2) of Thinking Machine Corp. and MP-1 of Mas Par Corp. are examples of the SIMD parallel computers.

CM2 is a hyperparallel machine based on such configuration that 16 pieces of 1-bit processors are integrated on one LSI chip, and 65536 processors are hypercube-connected on a 4096-chip unit. Each chip incorporates routers in addition to the processors. A memory chip is externally attached, and a memory capacity per processor is 256K bits. Inter-processor communication connections are based on grid connection (NEWS grid) communication. A communication mode known as a direct hypercube communication is available other than the typical message address based communication. The hypercube communication is effected by directly connecting 12 processors among 16 processors on the chip through 12 lengths of communication links.

MP-1 is a hyperparallel computer which has attained a parallelism as high as 16284 ($128 \times 128$) on the basis of a multi-stage, i.e., 3-stage connection network using $64 \times 64$ cross bar switch LSIs and two-dimensional grid connections (X-Net) for 8 pieces of adjacent processors by use of 512 CMOS LSIs each obtained by integrating 32 pieces of 4-bit processors on one chip. MP-1 has a 16 k-bit local memory per processor.

FIG. 8 is a block diagram showing an example of architecture of a conventional SIMD parallel computer.

Designated at 101 in FIG. 8 is a control circuit for handling the whole control over the parallel computer. The control circuit 101 generates a control signal CTR, an instruction INS and an address ADD. The control circuit 101 imparts the generated control signal CTR, the same instruction INS and the same address ADD to a plurality of arithmetic units 102, 102 . . . arranged in parallel via a control line 111, an instruction bus 112 and an address bus 113.

In the SIMD parallel computer, all the processors typically execute the same string of instructions issued from the control unit. However, when requiring ununiform calculations as seen under boundary conditions associated with, e.g., a particle motion and a thermal flow, arithmetic contents of some processors differ from those of a majority of other processors in some cases. In some of the prior art parallel computers, on this occasion the contents presumable in all cases have hitherto been given to the strings of instructions, the instructions are executed by operation authorizing flags provided in the respective PEs; or alternatively whether the execution is skipped or not is determined. In, for instance, CM2, each processor normally executes the same arithmetic operation. However, the execution can be skipped depending on an inside status thereof.

FIG. 9 is a block diagram showing a construction of the arithmetic units 102 of the conventional SIMD parallel computer. The instruction INS sent from the control circuit 101 via the instruction bus 112 is given to the arithmetic element 122.

The arithmetic element 122 is constructed to selectively execute a plurality of arithmetic processes such as addition and subtraction. The arithmetic element 122 performs an arithmetic process corresponding to the given instruction.

The address ADD supplied from the control circuit 101 via the address bus 113 is provided to the local memory 123 or the register group 121. The local memory 123 stores arithmetic data used in the arithmetic element 122 and data on the arithmetic result. The register group 121 temporarily stores the arithmetic data stored in the local memory 123 and the data in the middle of arithmetic operation and supplies the data to the arithmetic element 122. Besides, the register group 121 has an area for storing an operation authorizing flag 124 which authorizes the arithmetic unit 102 in terms of operation depending on a status thereof. A status of this operation authorizing flag 124 is controlled by the control signal CTR transmitted via the control line 111 of the control circuit 101.

In the thus constructed conventional SIMD parallel computer, the arithmetic operation based on the same instruction INS is effected referring to the same address ADD of the local memory 123 at the same point of time in all the arithmetic units 102, 102 . . . .

The operation of each arithmetic unit 102 is controllable depending on the status of the operation authorizing flag 124. More specifically, the operation authorizing flag is brought into an unauthorized status, whereby an execution of a certain instruction can be skipped per arithmetic unit 102. A flexibility of calculation is thereby obtainable. This also makes it possible to cause the SIMD parallel computer to work as if a MIMD parallel computer does.

To perform the arithmetic processes pursuant to different instructions per arithmetic unit in the conventional single instruction parallel computer, however, it is required that the following operations be effected the same number of times as the number of instructions thereof. Namely, the operation authorizing flag is put into an authorized status for only the arithmetic unit which is to execute a certain instruction. Only the authorized arithmetic unit executes a desired arithmetic process, while other arithmetic units skip that instruction and perform no arithmetic process.

With this arrangement, it is feasible to execute a sequence of instructions different from the whole in some PEs. Skipping of instruction, however, produces a dead time in terms of processing and is therefore unfavorable. Hence, what is desired is not skipping of instructions but an architecture that permits the executions of the different instructions.

Besides, the SIMD parallel computer generally needs a memory having a capacity large enough to store the data to be processed into each arithmetic unit. For this reason, the memory is ordinarily, though the arithmetic units are actualized on one LSI chip, provided outwardly of the LSI. When actualizing the arithmetic unit on one LSI chip, a plurality of arithmetic units (CPU) are formed as one arithmetic module on one LSI.

FIG. 10 is a block diagram showing an example of architecture of the above-mentioned conventional SIMD parallel computer.

Referring to FIG. 10, the reference numeral 201 represents an arithmetic unit composed of arithmetic parts 211 and memory parts 212. This computer is defined as a parallel computer, so that a multiplicity of arithmetic units 201 are disposed in parallel. A plurality of arithmetic parts 211 that are components of the arithmetic unit 201 are formed on one LSI chip 202. A plurality of such LSI chips 202 are further connected.

Note that each memory part 212 is not formed on the LSI chip 202 but is externally attached. The reason for this is that a large memory capacity is required to be prepared in the SIMD parallel computer, and hence using a dedicated memory circuit for the memory part 212 is more advantageous in terms of many aspects.

The SIMD parallel computer includes a central control circuit 203 for supplying a common memory address and instruction to all the arithmetic units 201. The instruction is issued from this central control circuit 203 to the arithmetic parts 211 of each arithmetic unit 201. The address is also given to the memory parts 212. Each arithmetic part 211 reads the data from the corresponding memory part 212 and executes the arithmetic operation. The result thereof is written as data to the memory part 212.

For the purpose of eliminating such a constraint that the memory address is common to all the arithmetic units among constraints with which the SIMD parallel computer is burdened, an address generating circuit is individually, provided in each arithmetic unit 201.

FIG. 11 is a block diagram showing one example of the construction described above. To be specific, each arithmetic unit 201 has an address generating/changeover circuit 2132 so newly provided on the LSI chip 202 as to be attached to the arithmetic part 211. This address generating/changeover circuit 213 accesses the memory part 212 by, e.g., register indirect addressing on the basis of a memory address given from the central control circuit 203.

Incidentally, in the SIMD parallel computer, a memory data width is, as in the case of CM2, for instance, approximately 1 bit per arithmetic unit. This aims at regulating an increment in the number of outside pins of the LSI chip 202 when forming the multiplicity of arithmetic parts 211 on one LSI chip 202. It is, however, required that an address width for the memory access be adaptive to a capacity of the memory part 212. Specifically, an address width needed is normally 10 bits through 20 bits or larger. Under such circumstances, the arrangement that the multiplicity of arithmetic parts 211 are formed on the LSI chip 202 is restricted in terms of the number of pins of the LSI chip 202.

The following is an explanation of another conceivable method. As illustrated in FIG. 12, the memory address is converted from a parallel signal into a series signal by means of a P/S (parallel/series) converting circuit 214 for converting the memory address into the series signal. The series signal is outputted outwardly of the LSI chip 202. The signal is restored to the original parallel signal by an S/P (series/parallel) converting circuit 215. The parallel signal is then inputted to the memory 212. There arises, however, a problem inherent in this method, wherein it needs an extra time for the conversion of the memory address into the series signal and the restoration to the parallel signal and further a circuit therefor, resulting in an increase in costs.

As discussed above, the arithmetic unit is divided into the arithmetic parts and the memory parts, and the plurality of arithmetic parts alone are formed en bloc on one chip (LSI) in the SIMD parallel computer. Based on this construction, when effecting register indirect addressing while referring to the memory part at an address indicated by a register within the arithmetic part, it is necessary for the arithmetic units to individually output the addresses. In this case, the address needs a bit width corresponding to the memory capacity of the memory part. When the plurality of arithmetic parts are formed en block on one chip, however, it is impossible to secure the necessary address width described above in terms of a restriction in the number of pins of the chip.

Concretely, in the great majority of LSI-based single instruction parallel computers, the address width is approximately 10 bits through 20 bits. Formed are 16 through 128 pieces of arithmetic parts per chip. Hence, the necessary number of pins for the memory addresses is 160 at the minimum. Those pins can not be packaged.

Furthermore, the SIMD parallel computer adopts configurations such as a grid connection communication links (NEWS grid) which typically provide connections in grids for communications between adjacent PEs and two-dimensional grid connections (X grid).

FIG. 13 is a block diagram illustrating an NEWS grid connection network of the conventional parallel computer. Processors 511, 511 ... arrayed in grids are connected to east, west, south and north (E, W, S, N) grid-4-neighbor processors 511, 511 ... via bidirectional communication links.

The following are demands for the communication connections to the grid-4-neighbor processors in the parallel computer where the processors are arrayed in grids.

(1) The data is transmitted in a selected direction among the four directions E, W, S and N of the grid. The target processor to which the data is transmitted receives data from a direction opposite thereto. For example, when a certain processor transmits the data in the direction N. The N-directional target processor receives the data from the direction S. The communication is thus established.

(2) The communication can be effected in the selected direction among the four directions of the grid.

(3) The number of communication links is small.

(4) All the processors simultaneously perform the communications in the same direction.

To meet those demands, the conventional parallel computer takes such an arrangement that the processors in the directions E, W, S and N of the grid are directly connected through bidirectional links.

FIG. 14 is a block diagram showing a construction of a conventional communication circuit of each of the processors 511, 511 . . . . The processors 511, 511 . . . include arithmetic elements 512 and the communication circuits 513. The arithmetic element 512 effects a process on the data received via the communication circuit 513, the process being pursuant to an instruction outputted from a control circuit (not shown) for handling the whole control. The processed data is transmitted through the communication circuit 513. The control circuit supplies 2-bit direction signal DS ti the communication circuit 513 of the processors 511, 511 . . . .

The communication circuit 513 consists of a 2-to-4 decoder 17 for decoding the 2-bit direction signal DS into four signals indicating the four directions N, E, W and S, output buffers 514a–514d or input buffers 515a–515d for respectively selecting the directions the transmission or receive data in response to the four decoded signals and an OR gate 516 for giving the receive data to the arithmetic element 512.

The 2-to-4 decoder 517 decodes the 2-bit direction signal DS into, e.g., 4-direction signals shown in Table 1.

TABLE 1

| Direction signal | Direction |
| --- | --- |
| 00 | N → S |
| 01 | E → W |
| 10 | W → E |
| 11 | S → N |

The output buffers 514a–514d are constructed by using open collector type NAND gates. The four signals transmitted from the 2-to-4 decoder 17 are supplied respectively to ends of input terminals of the output buffers. The transmission data are provided to the other ends thereof.

The transmission data outputted from the output buffers 514a–514d are outputted in any one direction selected among the four directions such as N→S, E→W, W→E and S→N via the bidirectional communication links.

The receive data inputted via the communication links are Inversion-inputted to one ends of the input buffers 515a–515d. The input buffers 515a–515d are constructed by use of AND gates. The four signals are supplied respectively to the other ends of the input buffers. The input buffers 515a–515d selectively output the receive data in response to the four signals; and outputs thereof are given to the arithmetic element 512 through the OR gate 516.

In the prior art parallel computer having the above-described architecture, when the communications are carried out at one time in the direction, e.g., N, the control circuit supplies all the processors 511, 511 . . . with the direction signals DS=00. Only the N→S direction signal of the 2-to-4 decoder thereby becomes 1. Only the output buffer 514a to the direction N and the input buffer 515a from the direction S become conductive, whereby a communicable state is developed. From this state, the transmission data is transmitted in the direction N, while the receive data is received from the direction S.

The conventional parallel computer, however, requires the I/O buffers in every direction. It is also necessary to generate the four signals for specifying the respective directions by decoding the 2-bit direction signal. This presents a problem where the hardware architecture of the communication circuits is intricate.

Two communication links are needed per processor, although each processor uses the communication links in common to the grid-4-neighbor processors.

An X-Net grid structure employed, e.g., MP-1 is obtained by expanding the NEWS grid connection network from the grid-4-neighbor connections to grid-8-neighbor connections. This X-Net grid structure is demonstrated by FIG. 15. As obvious from the Figure, each processor has the bidirectional communication links extending in directions such as north east (NE), north west (NW), south east (SE) and south west (SW) of the grid. NE, NW, SE and SW communication links led from each of four adjacent processors are wired-OR-connected, whereby the adjacent 8-neighbor processors are communicable with each other. With this arrangement, the communications with the 8-neighbor processors can be effected through a relatively small number of communication links. The construction of the communication circuit is, however, still the same as that of FIG. 14 (the I/O links are changed from N, E, W, S to NE, NW, SE, SW). It will be apparent that the communication control becomes more complicated.

SUMMARY OF THE INVENTION

It is a primary object of the present invention, which has been devised under such circumstances explained above, to provide an SIMD parallel computer capable of processing, as in the way with an MIMD parallel computer, a plurality of instructions at a high speed while keeping hardware characteristics of being simple in construction and low in costs by incorporating an instruction register for storing a local instruction into an arithmetic unit and selectively executing the local instruction and a common instruction issued from a control circuit.

It is another object of the present invention to provide an SIMD parallel computer capable of setting address and data bit widths sufficiently without undergoing a constraint of the number of pins of a chip.

It is still another object of the present invention to provide a parallel computer capable of attaining a communication function equivalent to the conventional one between grid-4-neighbor processors with a simple construction by reducing the number of communication links and a quantity of hardware within the communication circuits.

In the SIMD parallel computer according to the present invention, a common instruction is given from a control circuit to a plurality of arithmetic units each including an arithmetic element and a memory, and the given instruction is executed in parallel. In this SIMD parallel computer, the arithmetic unit has an instruction storage means for storing a local instruction, a selecting means for selecting any one of the common instruction and the local instruction stored in the instruction storage means, a selection control means for controlling a selecting operation of the selecting means and a means for executing the selected instruction.

In the computer system of this invention exhibiting such characteristics, when the arithmetic unit executes a plurality of instructions in parallel, the instruction storage means stores the local instruction, and the selecting means is controlled per arithmetic unit so as to select any one of the local instruction and the common instruction. The selected instruction is then executed.

For example, when executing add and subtract instructions in parallel, the add instruction defined as a common instruction is given from the control circuit to each arithmetic unit. At this time, the subtractive instruction is stored in the instruction storage means of the arithmetic unit which performs the subtractive instruction defined as a local instruction. The selecting means of the arithmetic unit for effecting the add instruction is so controlled by the selection control means as to select the add instruction. Conversely, the selecting means of the arithmetic unit for effecting the subtractive instruction is controlled to select the subtractive instruction in the instruction storage means. With this arrangement, the plurality of instructions can be simultaneously executed in parallel in the SIMD parallel computer. It follows that the processing time can be reduced.

In the prior art, the memories are connected directly to the plurality of arithmetic parts formed on one chip through pins fixedly allocated thereto. In contrast, an arrangement of the SIMD parallel computer of this invention is that each arithmetic part is connected to the memory via an address changeover circuit and a data changeover circuit as well. One arithmetic part is selectively connected to the memory under the selection control handled by the central control circuit.

In the thus configured SIMD parallel computer, where a plurality of arithmetic parts are packaged on one chip, the address can be generated in each of the arithmetic units. The address generated by each arithmetic part and the data transferred between the arithmetic part and the memory are inputted and outputted in a time-share manner between the chip and the memory outside the chip through the address changeover circuit and the data changeover circuit. Therefore, the memory access can be carried out with a sufficient data width by using all the pins provided on the chip.

In the parallel computer according to the present invention for performing parallel processing of the data through communications between the plurality of processors arrayed in grids, each processor has output links extending two directions of a first diagonal line of the grid and also input links extending in two directions of a second diagonal line thereof. The output links are connected to input or output links of 3-neighbor processors. Provided is a communication circuit for selecting one of the bidirectional output links by 1 bit of a 2-bit direction signal given to establish the communication direction and one of the bidirectional input links by another 1-bit.

In the computer system of this invention exhibiting such characteristics, when outputting the data to the 3-neighbor processors of the grid, the communication circuit specifies one of the bidirectional output links of the first diagonal line in the right upward (or left upward) direction by 1-bit of the 2-bit direction signal. The communication circuit also specifies one of the bidirectional input links of the second diagonal line in the right downward (or left downward) direction by another 1-bit of the direction signal. In this way, the communications with the grid-4-neighbor processors are attainable simply with the communication circuit specifying two output links and two input links.

BRIEF DESCRIPTION OF THE DRAWINGS

Other objects and advantages of the present invention will become apparent during the following discussion taken in conjunction with the accompanying drawings, in which:

FIG. 15 is a block diagram illustrating an X-Net type connection network of the conventional parallel computer.

DETAILED DESCRIPTION OF THE PREFERRED EMBODIMENTS

Embodiments of the present invention will hereinafter be described with reference to the accompanying drawings.

Figure 1:
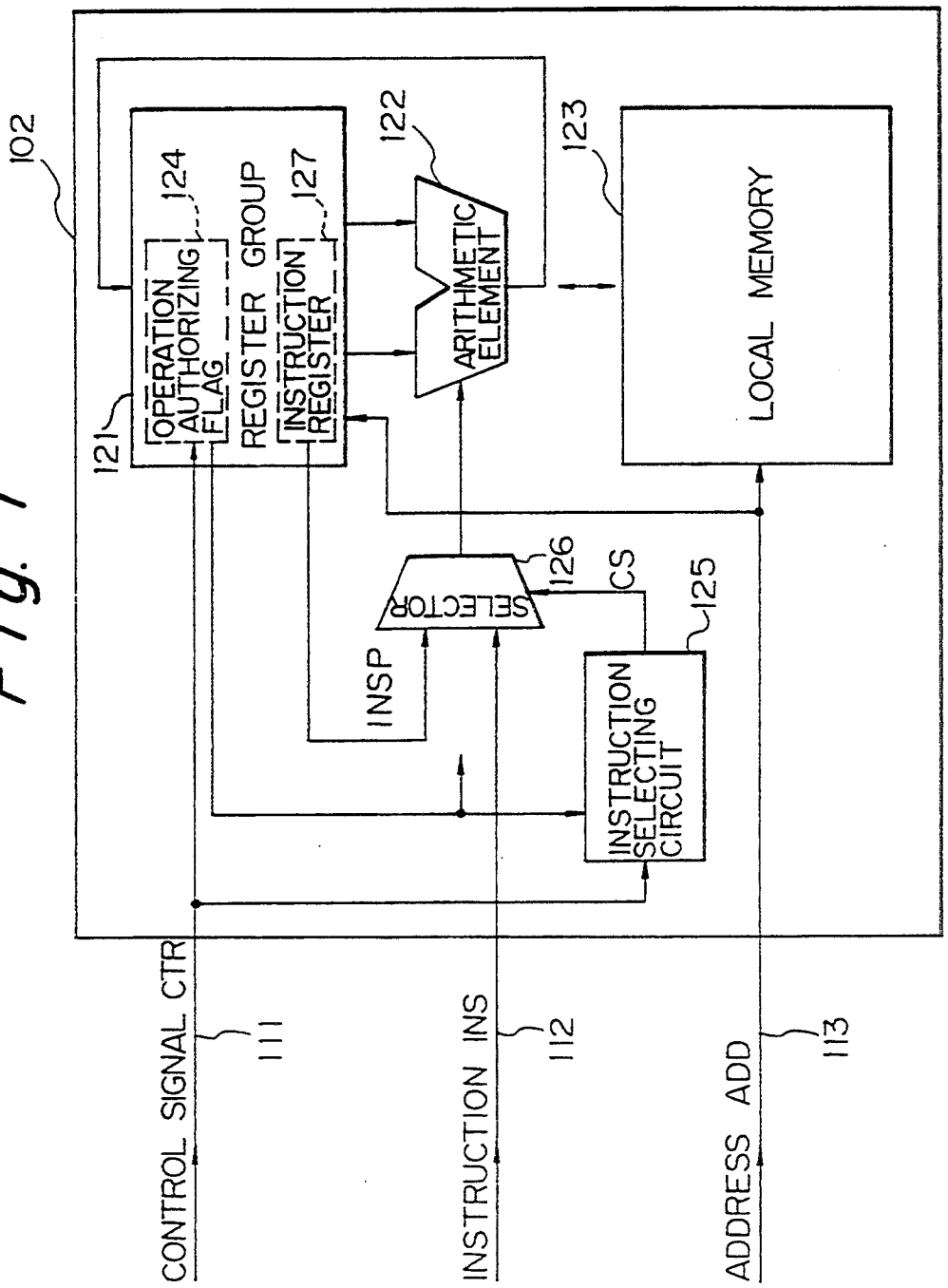
FIG. 1 is a block diagram illustrating a configuration of arithmetic units of an SIMD parallel computer of the present invention.

FIG. 1 is a block diagram illustrating a configuration of an arithmetic unit 102 of an SIMD parallel computer according to the present invention. Note that the whole configuration is the same with the conventional example shown in FIG. 2, and hence the description will be omitted.

Figure 8:
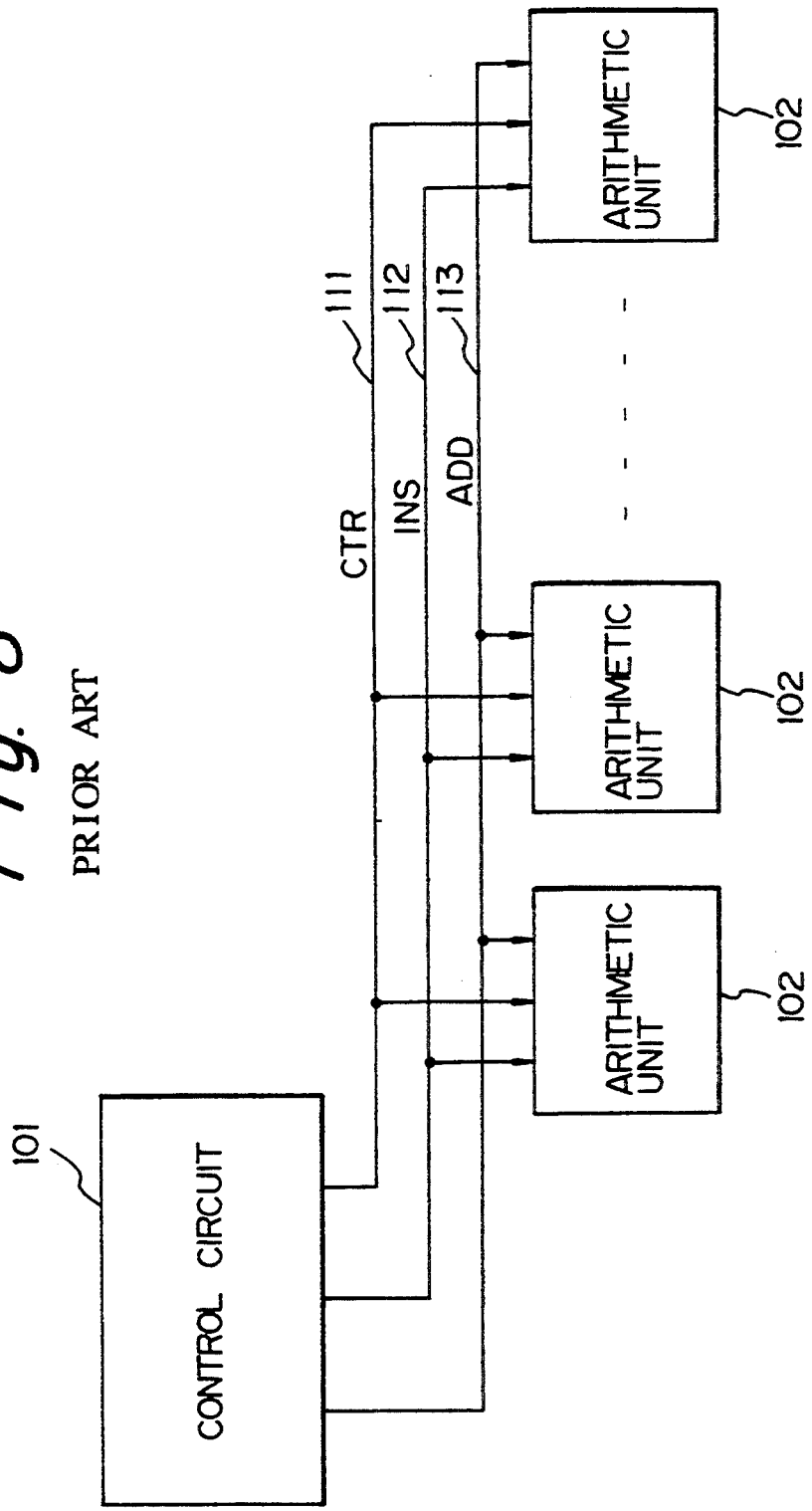
FIG. 8 is a schematic block diagram illustrating an entire architecture of a conventional parallel computer.
Figure 9:
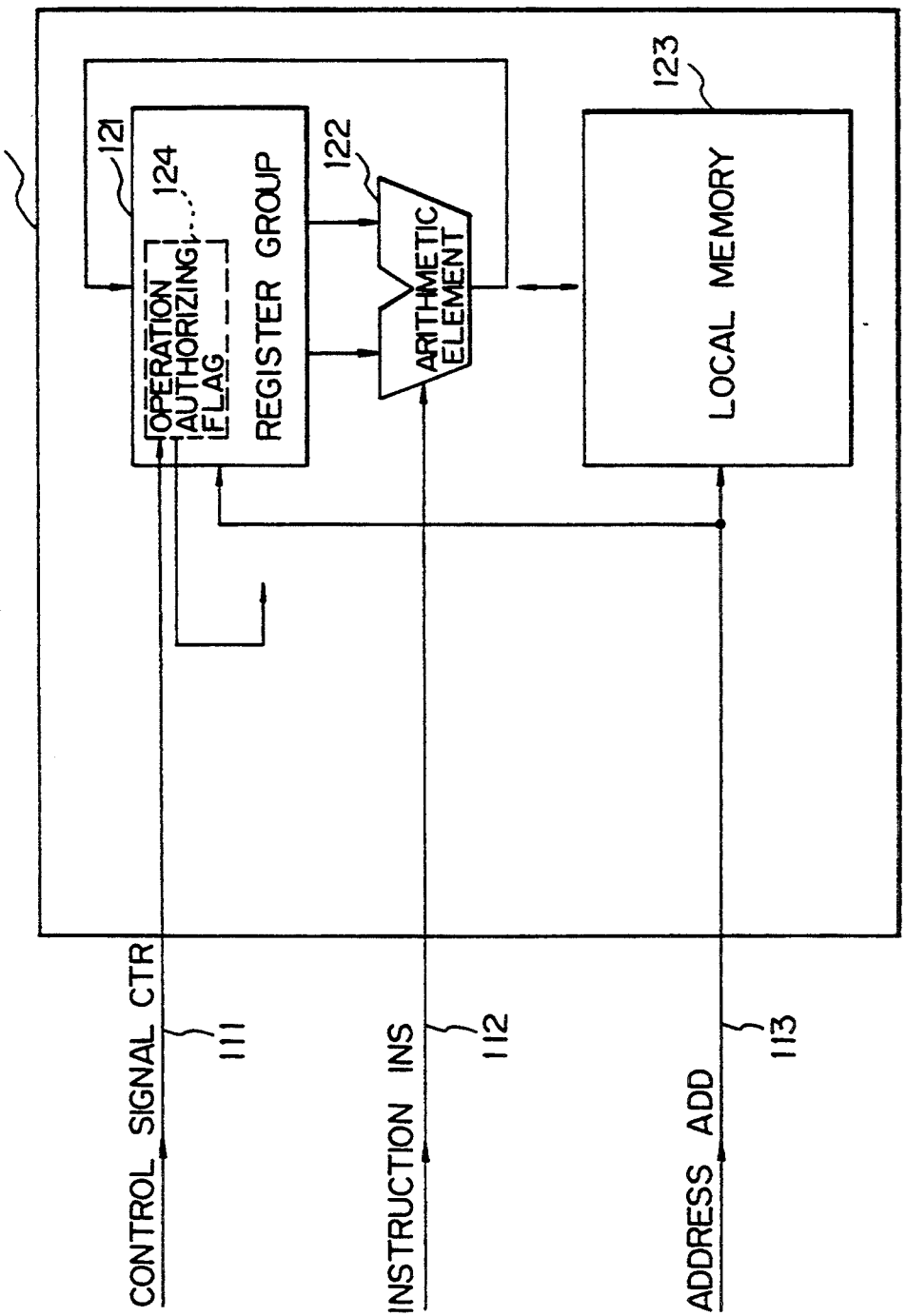
FIG. 9 is a block diagram showing a construction of a conventional arithmetic unit.

An instruction INS given from a control circuit 101 (see FIG. 8) via an instruction bus 112 is imparted to one end of a selector 126 serving as a selecting means. Given to the other end of the selector 126 is an instruction INSP stored in an instruction register 127 conceived as an instruction storage means. The instruction register 127, which is provided in a register group 121 which will be mentioned latter, stores a local instruction INSP generated by an arithmetic element 122. The selector 126 selects one of the two instructions INS and INSP given thereto. The selected instruction INS or INSP is sent to the arithmetic element 122. A selecting operation of the selector 126 is controlled by an instruction selecting circuit 125 defined as a selection control means. Given via a control line 111 to the instruction selecting circuit 125 are a control signal CTR transmitted from the control circuit 101 and an operation authorizing flag which will hereinafter be stated. A changeover signal CS is outputted to the selector on the basis of statuses of the control signal CTR and the operation authorizing flag.

The arithmetic element 122 performs an arithmetic process corresponding to the instruction given. For instance, when storing the instruction INSP in the instruction register 127, a corresponding instruction INS is issued from the control circuit 101 via the selector. Data is read from a local memory 123. An instruction INSP required therefor is generated and stored in the instruction register 127 of the register group 121.

On the other hand, an address ADD imparted from the control circuit 101 via an address bus 113 is given to the local memory 123 or the register group 121. The local memory 23 works to store arithmetic data employed in the arithmetic element 122 and data on the arithmetic results. The register group 121 temporarily stores the arithmetic data stored in the local memory 123 and the data in the middle of arithmetic process and imparts the data to the arithmetic element 122.

The register group 121 has an area for storing operation authorizing flags 124 indicating an authorization of operation, a non-authorization and, if authorized, the alternative of instructions which is selected by the selector 126 depending on the statuses to the arithmetic unit 102. The register group 121 is, as described above, provided with the instruction register 127 for storing the local instruction INSP generated by the arithmetic element 122.

In the thus configured single instruction parallel computer of this invention, the respective arithmetic units 102, 102... execute the common instruction INS issued from the control circuit 101 depending on the statuses of the operation authorizing flags 124 and the control signals CRT transmitted form control circuit 101. Those arithmetic units alternatively execute, after the selector 126 has made a selection whether to execute the local instruction INSP stored in the instruction register 127, the thus selected instruction.

Where addition and subtraction are now simultaneously executed by parallel processing, it is assumed that, for example, an add instruction be a common instruction INS, while a subtract instruction be a local instruction INSP. The subtract instruction is at first generated. For this purpose, the control circuit 101 imparts an instruction to generate the subtract instruction to each of the arithmetic units 102, 102.... At this moment, the operation authorizing flags 124 of the arithmetic units 102, 102... assume an authorized status. In response to the control signal CTR, the instruction selecting circuit 125 outputs the changeover signal CS to cause the selector 126 to select the instruction INS. Outputted at this time from the control circuit 101 via the address bus 113 is the address ADD of such a portion that the data to generate the subtract instruction is stored in the local memory 123. Simultaneously, an address of the instruction register 127 is outputted to the register group 121.

The arithmetic element 122 generates the subtractive instruction which is in turn stored in the instruction register 127. Values distinguishably indicating an authorization, a non-authorization and, if authorized, the selection by the selector 126 are subsequently set to the operation authorizing flag 124 in response to the control signal CTR. When executing the addition and subtraction, all the arithmetic units 102, 102... are brought into the authorized status. Set to the operation authorizing flag 124 are such values as to change over the selector to the control circuit 101 with respect to the arithmetic units 102, 102... which execute the add instruction and to the instruction register 127 with respect to the arithmetic units 102, 102... which execute the subtractive instruction. Next, the control signal CTR is given to the instruction selecting circuit 125. Determined is any one of such three instruction executing patterns that all the arithmetic units 102, 102... execute the local instruction INSP of the instruction register 127; or the arithmetic units 102, 102... execute the instruction INS issued from the control circuit 101; or in accordance with the operation authorizing flag, the arithmetic units execute the instruction INSP of the instruction register 127 on one hand and also execute the instruction INS given from the control circuit 101 on the other hand.

In this case, the third pattern is determined according to the control signal CTR. The values described above are set to the operation authorizing flag 124. The add instruction is issued from the control circuit 101, while the subtract instruction is issued from the instruction register 127.

As explained earlier, according to the present invention, an intrinsic instruction is executable per arithmetic unit in addition to the same single instruction as the conventional one.

The instruction selecting circuit 125 is possible of decision on whether the instruction to be executed is obtained from the common instruction or from the intrinsic instruction register 127. A frequency at which the instructions are generated can be reduced owing to this selection. Namely, when selectively executing the two instructions, one instruction is obtained from the common instruction, and it follows that only the other instruction may be generated for storage in the instruction register 127.

As discussed above, according to the present invention, the arithmetic unit incorporates the instruction storage means for storing the local instruction, the selecting means for selecting any one of the common instruction and the local instruction and the selection control means for controlling the selecting operation of the selecting means. The instruction to be executed by the selecting means is selectable. Hence, there are exhibited excellent advantages in which a plurality of instructions can be simultaneously executed in parallel while holding the characteristics of the single instruction parallel computer, and the processing time can be reduced.

Figure 2:
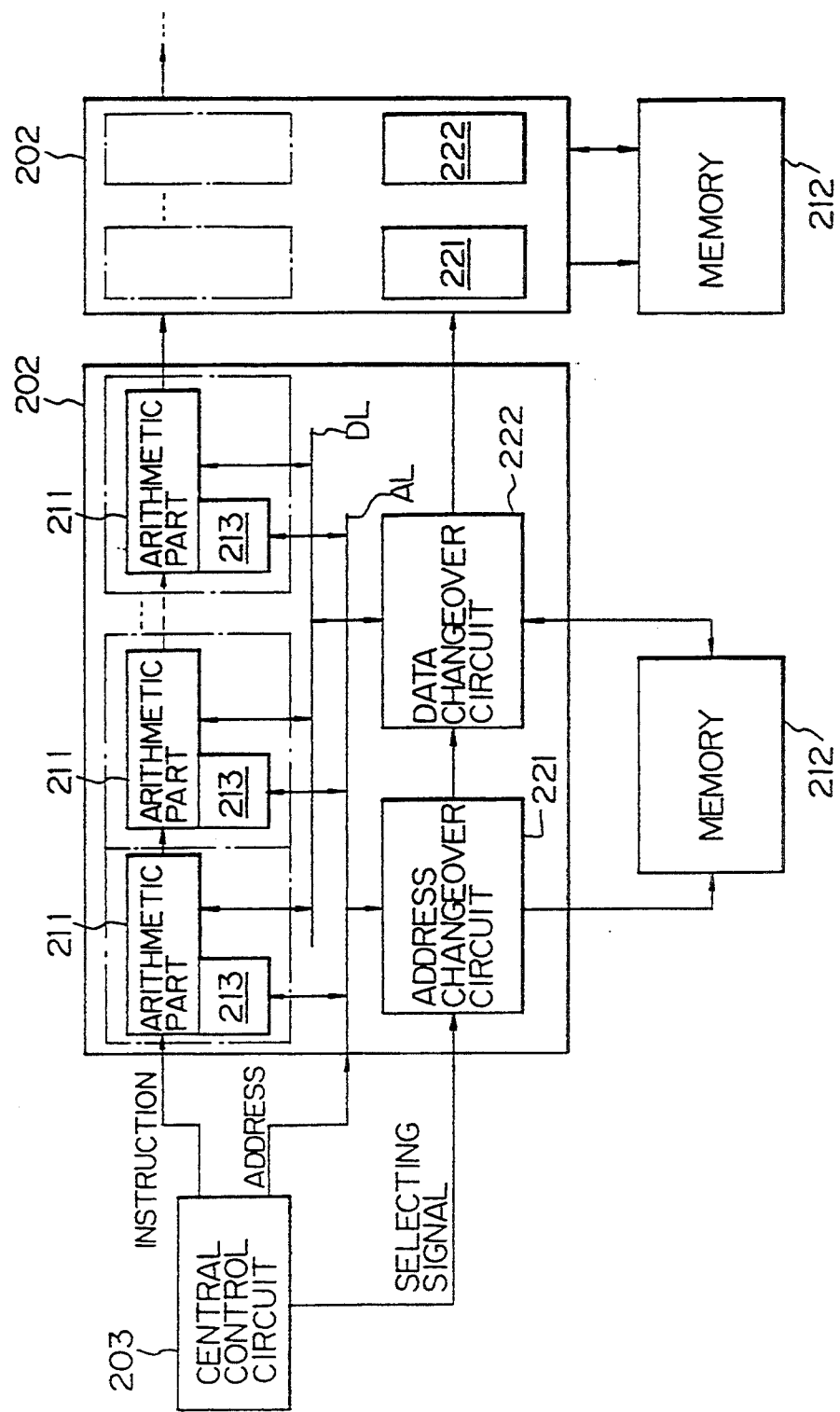
FIG. 2 is a block diagram showing one example of architecture of the SIMD parallel computer of this invention.
Figure 10:
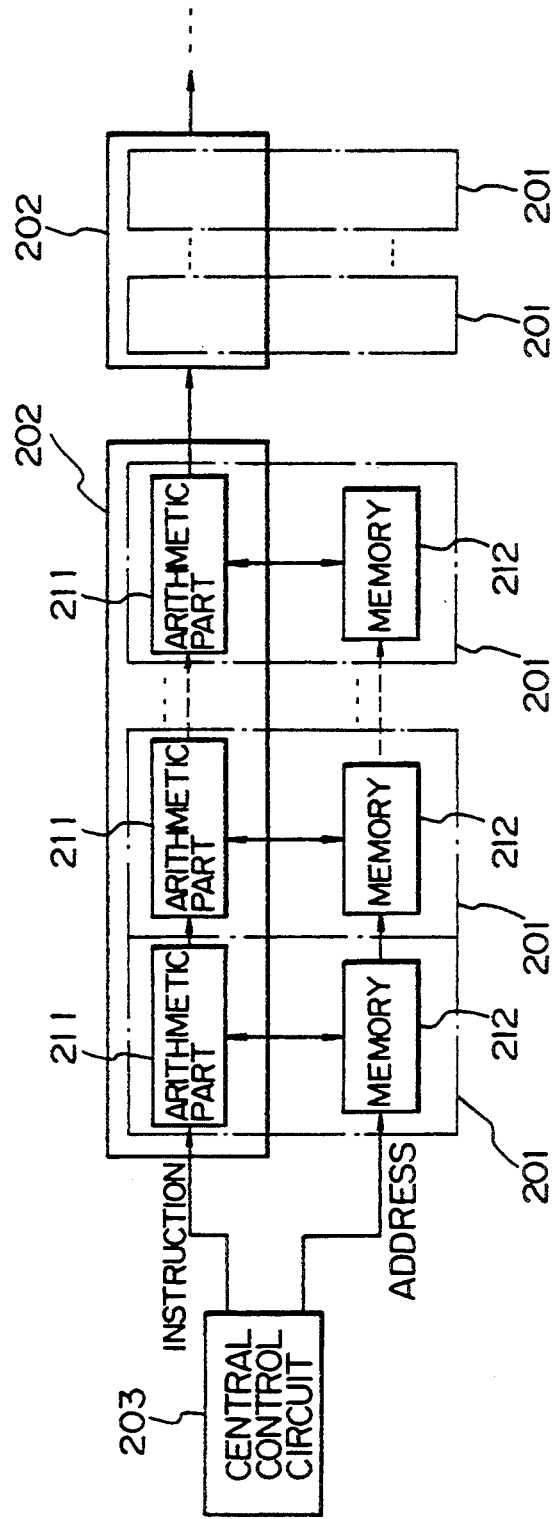
FIGS. 10 to 12 are block diagrams each showing an example of configuration of an arithmetic unit and an external memory of the conventional SIMD parallel computer.
Figure 11:
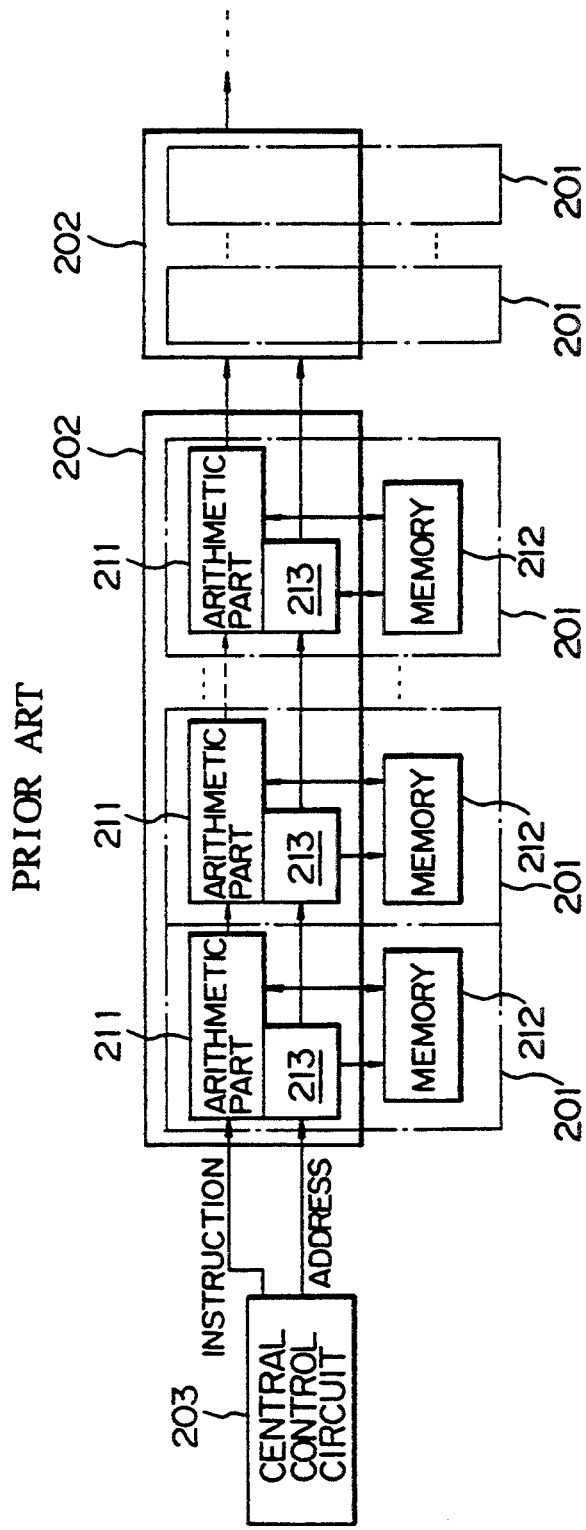
Figure 12:
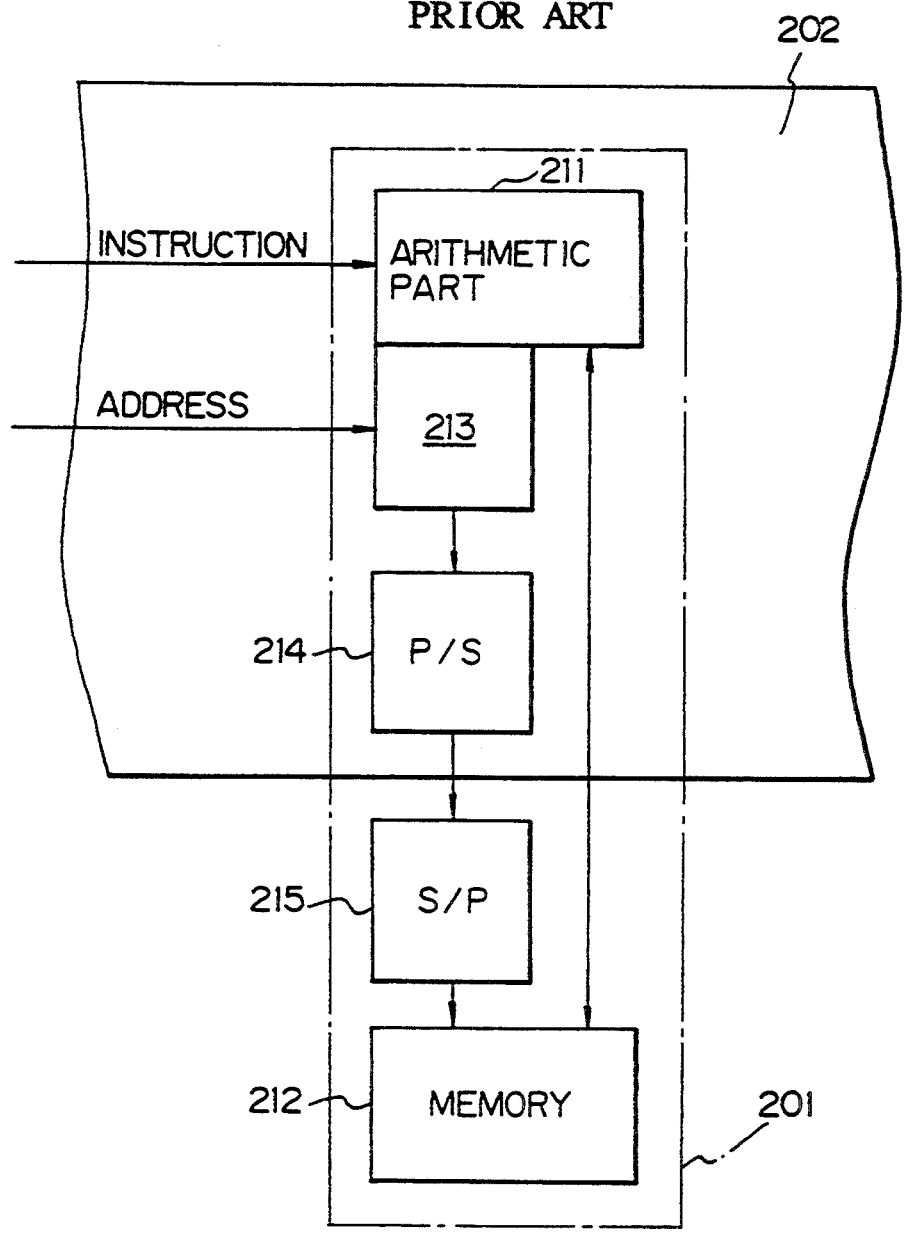
Figure 13:
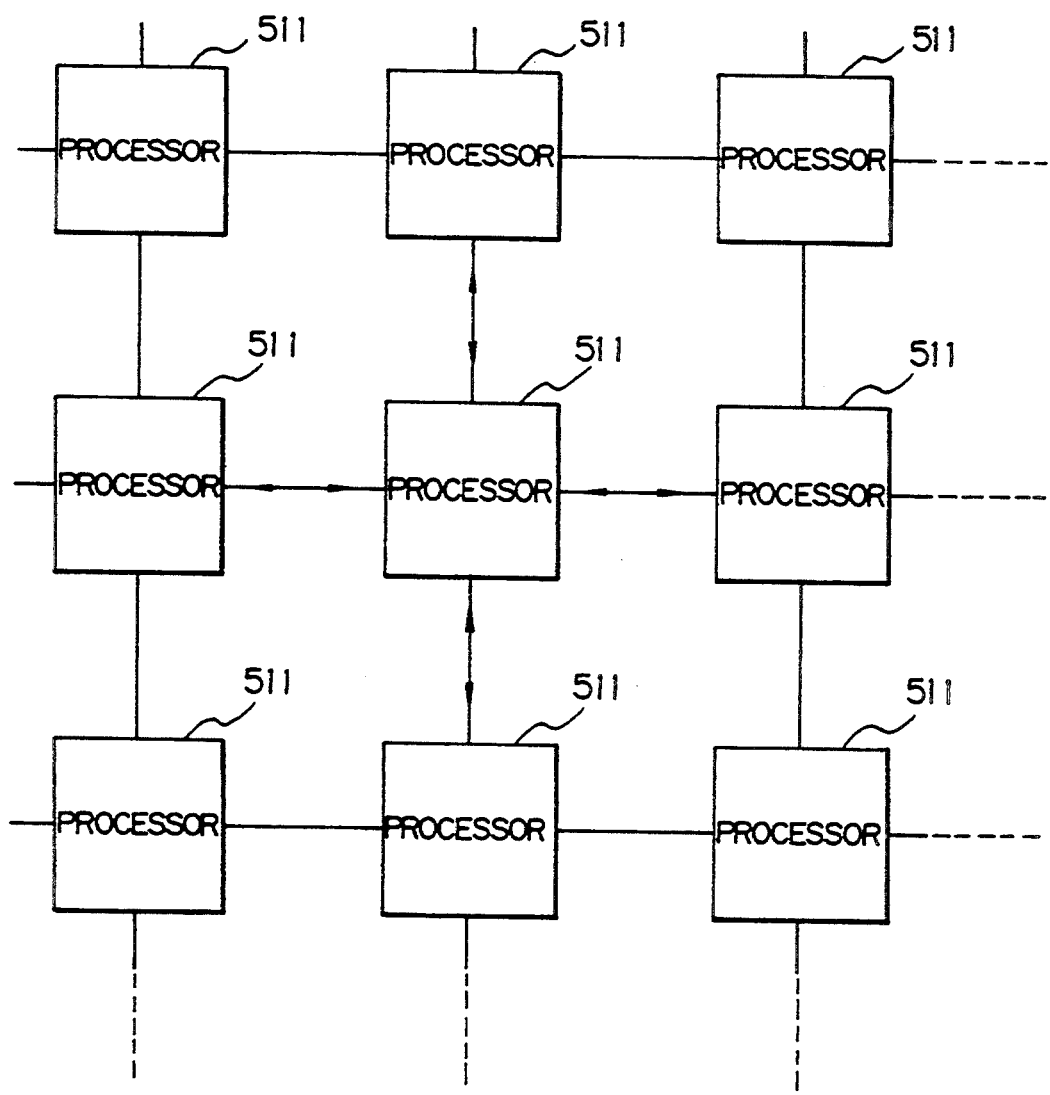
FIG. 13 is a block diagram illustrating an NEWS type connection network of the conventional parallel computer.
Figure 14:
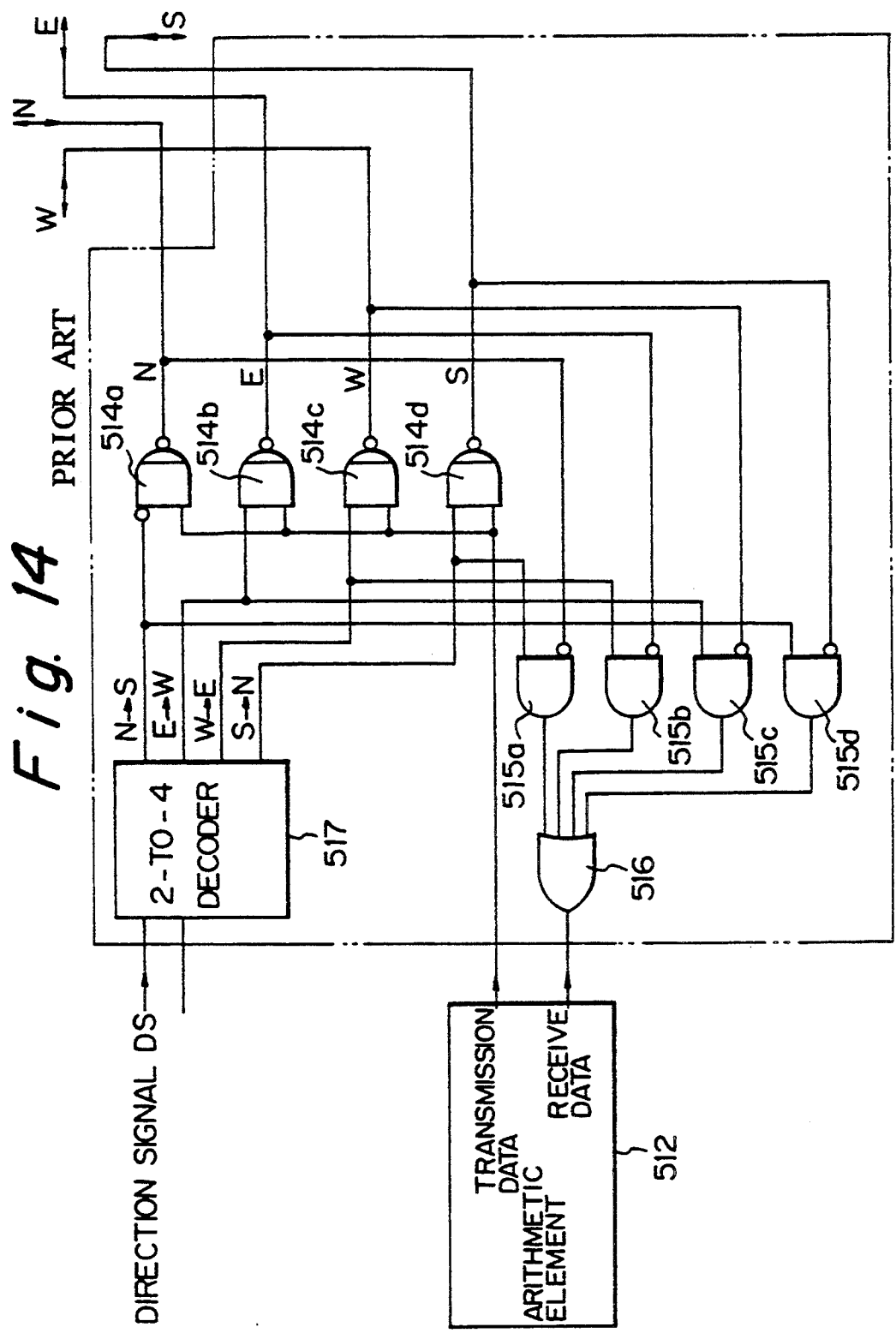
FIG. 14 is a block diagram showing a construction of a communication circuit of the processor of the conventional parallel computer.

FIG. 2 is a block diagram illustrating one example of configurations of the arithmetic unit and the external memory of an SIMD parallel computer according to the present invention. The same or corresponding components to those of FIGS. 10 through 12 showing the above-described conventional example are marked with the like reference symbols.

Referring to FIG. 2, the reference numeral 202 represents an LSI chip formed with a plurality of arithmetic parts 211, address generating circuits 213 attached to the respective arithmetic parts 211, a single address changeover circuit 221 and a single data changeover circuit 222.

Designated at 212 is a single piece of memory externally attached to one LSI chip 202.

Indicated at 203 is a central control circuit provided for supplying a common memory address and instruction to all the arithmetic parts 211 in the single instruction parallel computer of this invention. The instruction is issued from this central control circuit 203 to the respective arithmetic parts 211, and an address is also given to an address line AL which will be mentioned latter.

The address generating circuits 213 are attached to the respective arithmetic parts 211 and, to be specific, constructed of latch circuits. Each address generating circuit 213 is provided for the purpose of permitting the respective arithmetic parts 211 to refer to the memory 212 at different addresses. More specifically, the individual arithmetic parts 211 normally refer to the memory 212 at the address common to all the arithmetic parts 211 which is outputted from the central control circuit 203. However, each address generating circuit 213 makes each arithmetic part 211 accessible to the memory 212 with an arithmetic result serving as a memory address as the necessity arises.

An address pin and a data pin serve to connect the address changeover circuit 221 and the data changeover circuit 222 on the LSI chip 202 to the memory 212 provided outwardly of the LSI chip 202. These pins are selectively used by one arithmetic part 211 with a changeover to each arithmetic part 211 on the basis of a time-shared usage. A concrete explanation will be given as follows.

The address changeover circuit 221 is concretely composed of a selector and singly provided on each LSI chip 202. The address changeover circuit 221 is connected via the address line AL to the respective arithmetic parts 211 on the LSI chip 202. Note that an address signal line led from the central control circuit 203 is also connected to the address line AL on the LSI chip 202.

The address changeover circuit 221 is connected to the memory 212 through the address pin for connecting the LSI chip 202 to the outside. The address changeover circuit 221 selects one arithmetic part 211 which actually outputs the address to the memory 212 among the plurality of the arithmetic parts 221 on the LSI chip 202. The selecting operation thereof is controlled by a selecting signal outputted from the central control circuit 203.

The data changeover circuit 222 is concretely composed of a selector as in the same way with the address changeover circuit 221. This circuit 222 is singly provided on each LSI chip 202. The data changeover circuit 222 is connected via a data line DL to the individual arithmetic parts 211 on each LSI chip 202.

The data changeover circuit 222 is connected to the memory 212 through the data pin for connecting the LSI chip 202 to the outside. The data changeover circuit 222 selects one arithmetic part 211 which actually outputs the data to the memory 212 and inputs the data from the memory 212 among the plurality of arithmetic parts 211 on the LSI chip 202. The selecting operation thereof is conditioned by address/data selecting signals outputted from the central control circuit 203. As a matter of course, however, the arithmetic part 211 selected by the address changeover circuit 221 is identical with the arithmetic part 211 selected by the data changeover circuit 222.

Based on the architecture described above, sufficient widths can be given to both the address pin and the data pin.

Figure 3:
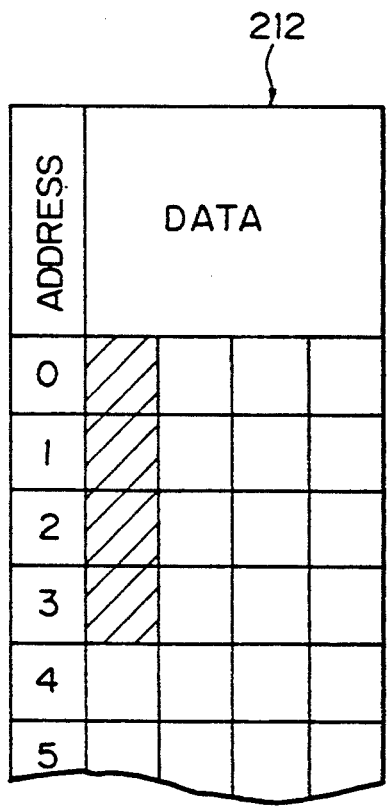
FIG. 3 is a schematic diagram illustrating a data storage format within a memory in a conventional SIMD parallel computer.
Figure 4:
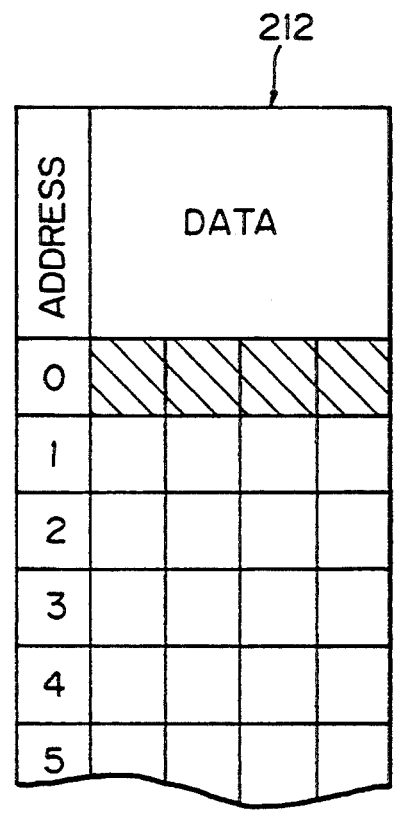
FIG. 4 is a schematic diagram illustrating a data storage format within a memory in the SIMD parallel computer of this invention.

As discussed above, in the great majority of cases a data width of the memory 212 has hitherto been 1 bit in the prior art. In accordance with the architecture of the present invention, however, sufficient bit widths for connection to the memory 212 can be given to the address pin and the data pin as well. Hence, in the prior art, as shown by hatching in the schematic diagram of FIG. 3, the data (4-bit data are shown as one example) which are to be stored in the memory 212 are stored in series astride of a plurality of addresses of the memory 212. By adopting the architecture of this invention, however, as shown by hatching in FIG. 4, the data are stored in parallel in one address. With this arrangement, a correspondence of the storage contents of the memory 212 to the addresses is the same as that of an ordinary appliance. Therefore, a direct reference by the external appliance to the memory 212, i.e., the control over direct memory access (DMA), is facilitated.

Note that in the embodiment discussed above the LSI chip is provided with the address changeover circuit 221 for changing over the address outputted from the central control circuit 203 to the address generated within the LSI chip 202, but this circuit 221 may be, as a matter of course, provided outwardly of the LSI chip 202.

The above-described architecture of the present invention can be used in combination with the conventional architecture previously explained.

As discussed above, according to the present invention, where the plurality of arithmetic parts of the SIMD parallel computer are packaged on one chip, the addresses can be generated in each arithmetic unit. Besides, there are exhibited excellent effects in which no decline in performance can be seen, and a matching property of address with the external appliance is improved.

Figure 5:
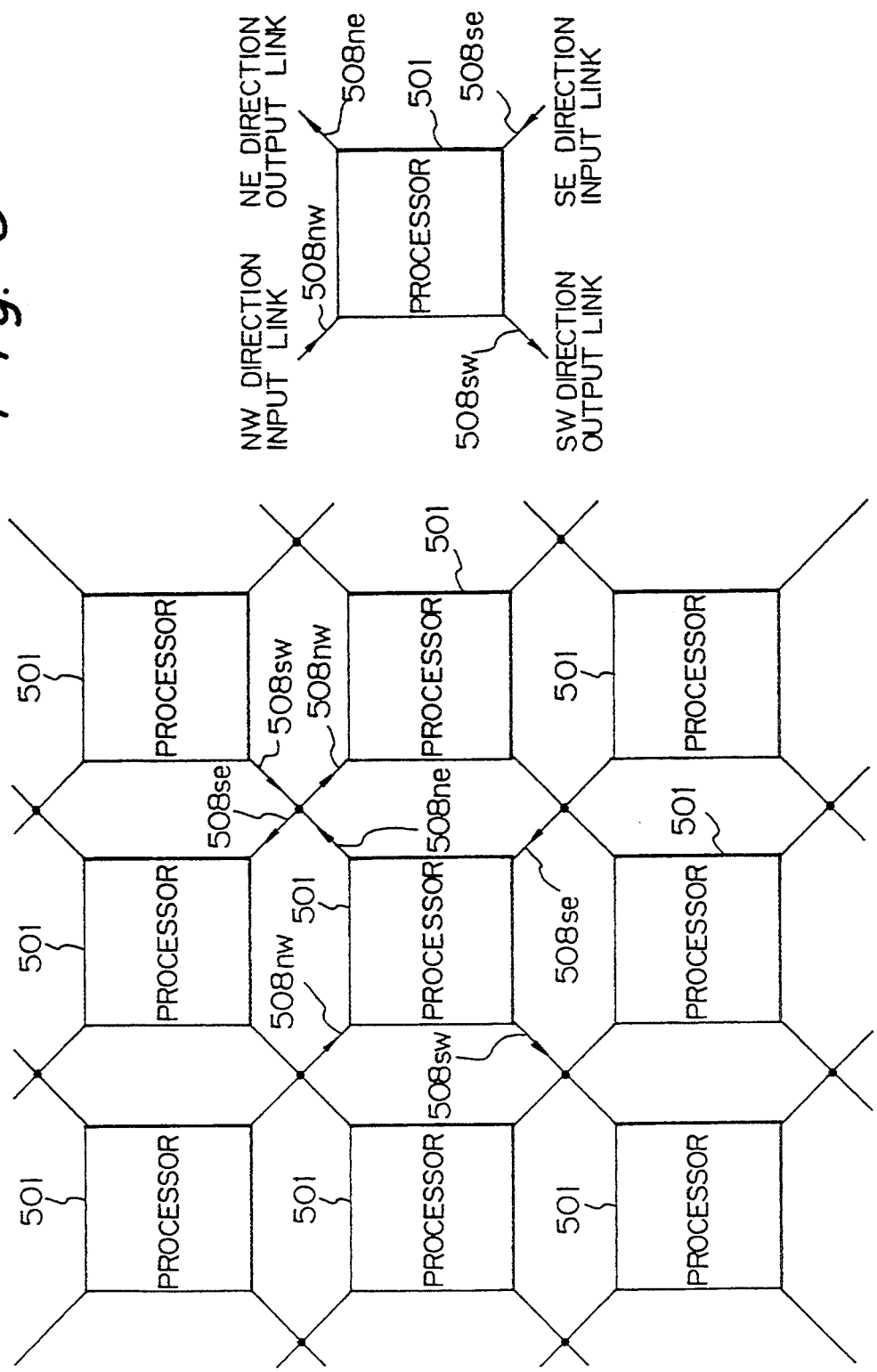
FIG. 5 is a block diagram depicting a connection network of the parallel computer of this invention.

FIG. 5 is a block diagram illustrating a connection network of the parallel computer of this invention. Individual processors 501, 501 . . . arrayed in grids include and output link 508$ne$ extending in one right upward direction (north east which will hereinafter be abbreviated NE) of two directions of a first diagonal line and an output link 508$sw$ extending in the other left downward direction (south west abbreviated to SW) thereof. Provided also are an input link 508$se$ extending in one right downward direction (south east abbreviated to SE) of two directions of a second diagonal line and an input link 508$nw$ extending in the other left upward direction (north west abbreviated to NW) thereof. The NE-direction output link 508$ne$ of the processors 501, 501 . . . is connected to the SE-direction input link 508$se$, the SW-direction output link 508$sw$ and the NW-direction input link 508$nw$ of the processors 501, 501 . . . in an upward (hereinafter referred to as N) direction, in the NE-direction and in a right (referred to as E) direction.

It is to be noted that the connections of the respective input/output links are effected based on wired AND.

Hence, the signals on the communication links are all negative logic, thereby actualizing wired OR. Other SW-direction output link 508sw, the NW-direction input link 508nw and the SE-direction input link 508se are similarly connected. Therefore, a single link may suffice for one processor 501. A hardware quantity of the communication links is reduced by a factor of 2 as compared with the prior art.

Figure 6:
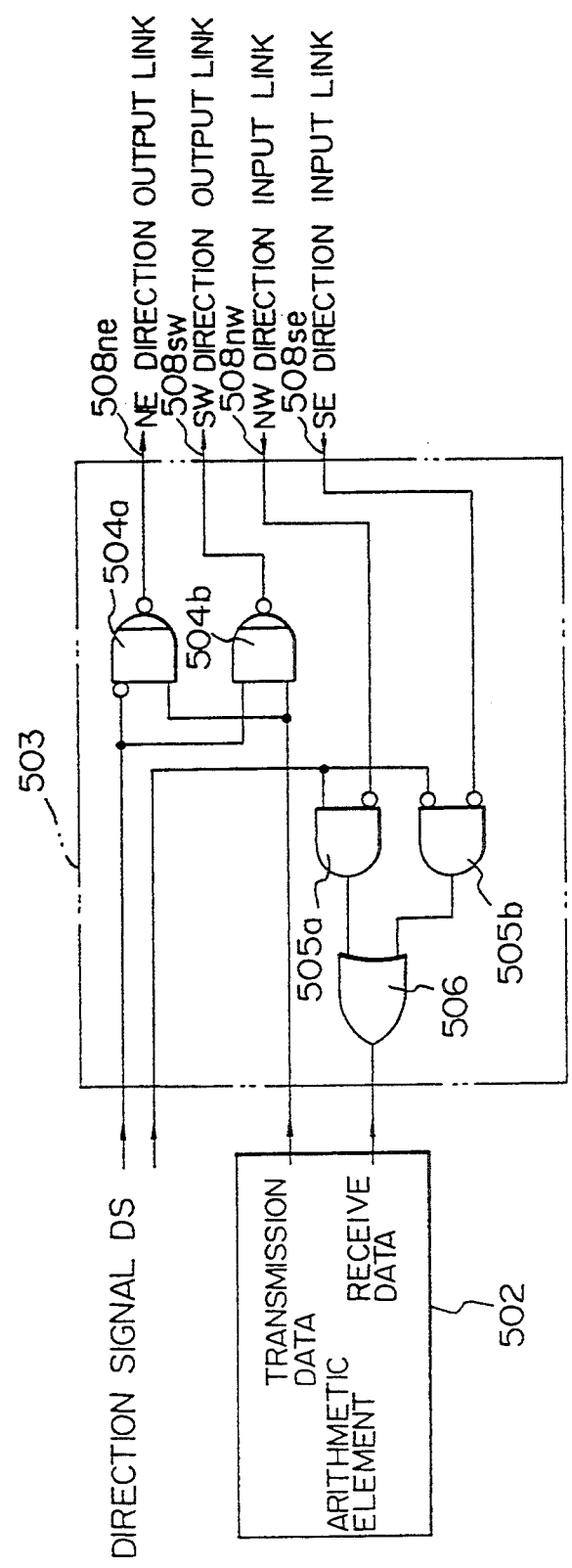
FIG. 6 is a block diagram showing a construction of a communication circuit of the processor of the parallel computer of this invention.

FIG. 6 is a block diagram depicting a configuration of the processors 501, 501 . . . . The processors 501, 501 . . . include arithmetic elements 502 and communication circuits 503. With respect to the data received, the arithmetic element 502 effects a process pursuant to an instruction outputted from an unillustrated control circuit for handling the whole control. The arithmetic element 502 transmits the processed data. The control circuit sends 2-bit direction signals DS to the respective processors 501, 501 . . . . The 2-bit direction signals DS, as shown in Table 2, indicate communication directions of the processors 501, 501 . . . . For instance, when DS=00, it indicates a direction from N to S. Relations between the direction signals and the directions are the same with the conventional example.

TABLE 2

| Directional signal | Direction |
| --- | --- |
| 00 | N → S |
| 01 | E → W |
| 10 | W → E |
| 11 | S → N |

High-order 1 bit of the direction signal is inversioninputted to an output buffer 504a and is at the same time inputted to one end of an output buffer 504b. The output buffers 504a and 504b are constructed by use of open collector type NAND gates. The data transmitted from the arithmetic elements 502 are supplied respectively to the other ends thereof. The outputs of these buffers are given to the NE-direction output link 508ne and the SW-direction output link 508sw, respectively. Low-order 1 bit of the direction signal DS is inputted to one end of an input buffer 505a which employs an AND gate and is simultaneously inversion-inputted to one end of an input buffer 505b. Inversion-inputted to the other ends of the input buffers 505a and 505b are the receive data given from the NW-direction input link 508nw and the SE-direction input link 508se. The outputs of these buffers are supplied via an OR gate 506 to the arithmetic element 502.

One of the output buffers 504a and 504b is selected by the high-order 1 bit of the direction signal DS. One of the input buffers 505a and 505b is selected by the low-order 1 bit. Hence, a decoder required for the prior art is not needed. Besides, the number of gates for the buffers is halved, and the hardware quantity of the communication circuits 503 is also reduced.

The following is a description of the thus constructed parallel computer of this invention. When performing the communications in, e.g., an S→N direction, the direction signal defined by DS=00 is supplied to each of the processors 501, 501 . . . from the control circuit. The output buffers 504a and the input buffers 505b are thereby selected. Only the NE-direction output link 508ne is possible of data output in the respective processors 501, 501 . . . , whereas only the SE-direction input link 508se is impossible of data input. In this status, the NE-direction output link 508ne is connected to the SE-direction input link 508se of the N-direction processor 5-1, as a result of which the communication in the N-direction is established.

The arrangement is the same with other directions such as E→W, W→E and S→N. The communications in four directions are established by a combination of two output links with two input links.

Note that 1-bit width communication links are shown in the architecture of this embodiment. This arrangement is, however, provided for the sake of explanatory convenience. The present invention is not limited to this arrangement but may be, as a matter of course, likewise applicable to multi-bit width communication links.

The connection network in this embodiment involves the use of wired AND. The present invention is not, however, limited to the wired AND. A three-state buffer is usable as an output buffer.

Applicable also to the present architecture are a variety of conventional grid terminal connecting processes such as a torus connection where the processors at bilateral and vertical ends are connected, a cylindrical connection where the processors at bilateral or vertical ends are connected and so on.

As explained earlier, according to the present invention, the grid-4-neighbor (vertical and bilateral) processors are communicable simply by individually selecting two bidirectional output links of the first diagonal line of the grid and two bidirectional input links of the second diagonal line thereof. Exhibited is such an excellent effect that the bidirectional communications with grid-4-neighbor processors are attainable as a function equivalent to the conventional one with a simple construction requiring a less amount of hardware of the communication links and circuits.

Figure 7A:
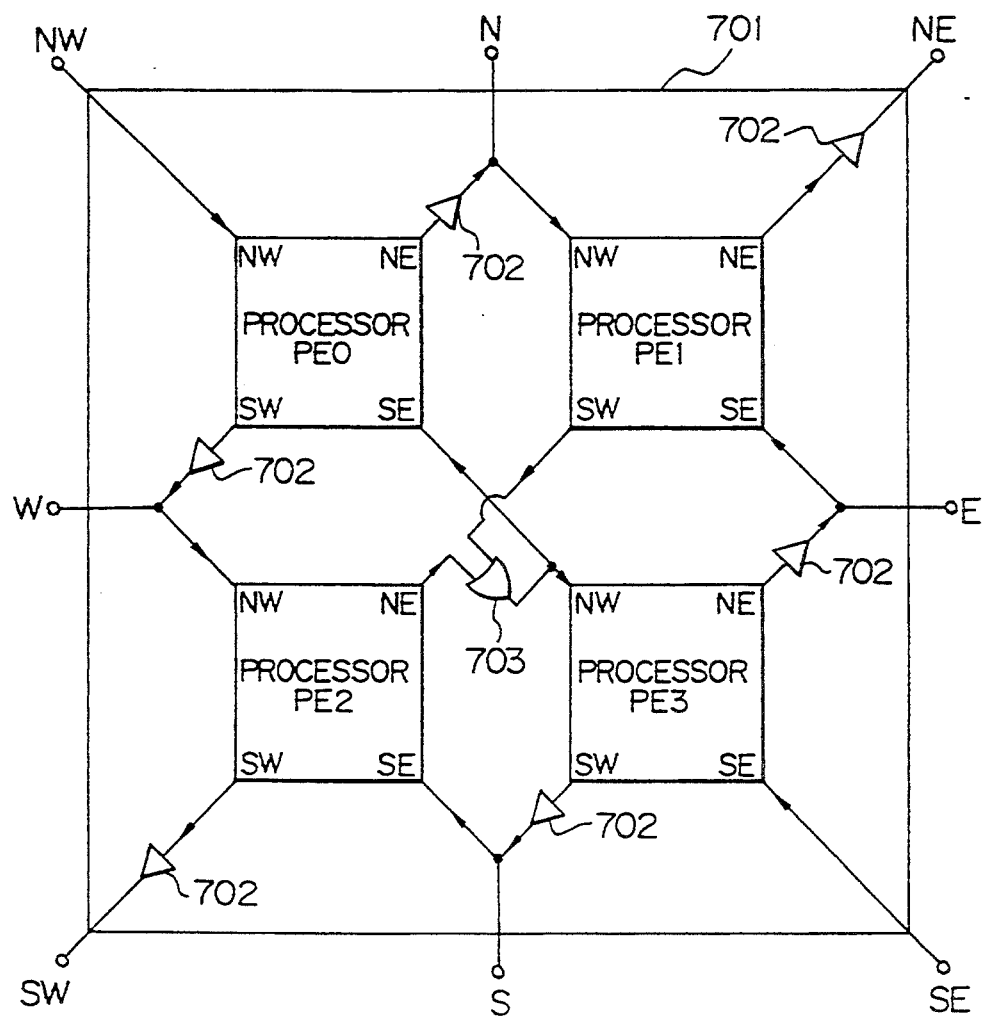
FIGS. 7A and 7B are block diagrams showing actual examples of connection networks of the parallel computer of this inventions.

FIG. 7A is a block diagram showing an example where the connecting structure of the processors according to the present invention is put into practice on the actual LSI chip. Referring to FIG. 7A, the numeral 701 denotes an LSI chip on which four pieces of processor elements PE0, PE1, PE2 and PE3 are formed. Outputs (NE, SW) of each processor are connected via a driving circuit 702 to a predetermined conductor. Note that this driving circuit 702 may serve as a gate for controlling a signal transfer. In this embodiment, the connections of the four intra-LSI processors are attained by connecting SW of the processor PE1 to NW of the processor PE2 through an OR circuit 703 and further connecting SE of the processor PE0 to NW of the processor PE3.

Figure 7B:
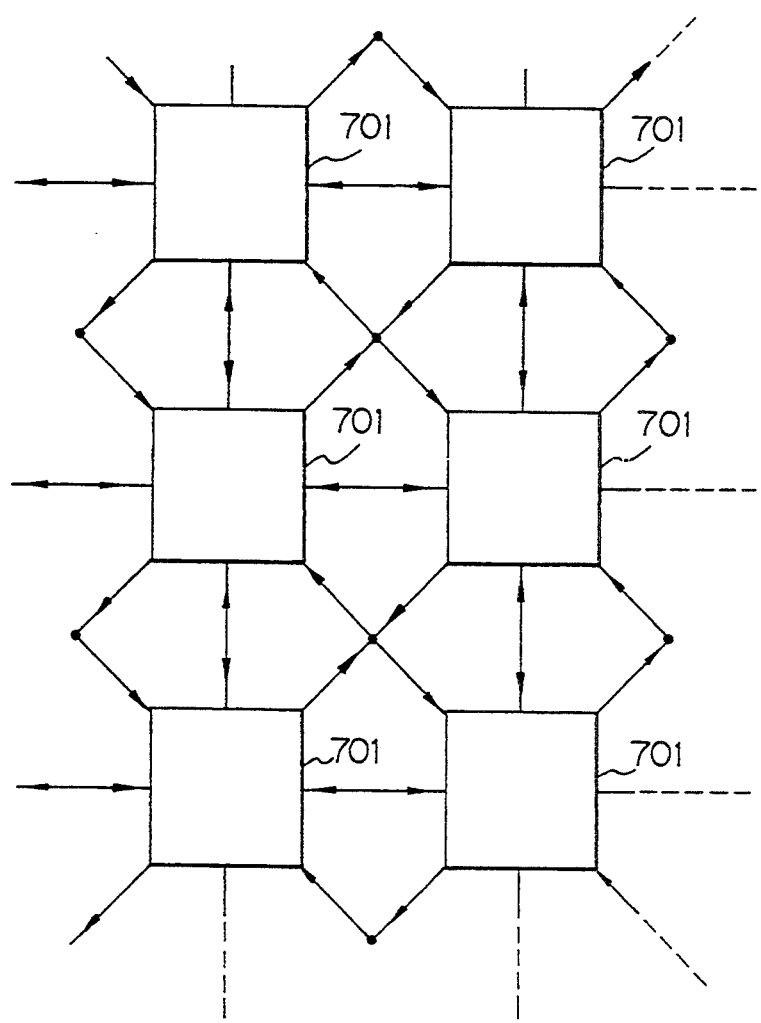

FIG. 7B is a block diagram illustrating a connecting structure by use of the LSI chip. A large-scale connecting structure according to the present invention can be actualized by connecting, as depicted in the Figure, an E-terminal to a W-terminal, an N-terminal to an S-terminal, an NE-terminal to an SW-terminal and an NW-terminal to an SE-terminal on each LSI chip.

Although the illustrative embodiments have been described in detail with reference to the accompanying drawings, it is to be understood that the present invention is not limited to those embodiments. Various changes or modifications may be effected therein by one skilled in the art without departing from the scope or spirit of the invention.

What is claimed is:

1. A single instruction parallel computer comprising:
   a plurality of arithmetic units;
   a control unit for providing the same instruction representing an arithmetic operation, the same address signal, and the same control signals to each of said plurality of arithmetic units to control operation of said arithmetic units, wherein each of said arithmetic units comprises:
(a) an arithmetic element for executing a plurality of arithmetic operations;
(b) a local memory for storing an arithmetic result given by said arithmetic element and data to be computed at said arithmetic element, said local memory being accessed by said address signal from said control unit;
(c) instruction storage means for storing a local instruction representing a local arithmetic operation;
(d) operation authorization storage means for storing an operation authorizing flag representing whether or not said arithmetic element should execute said local instruction; and
(e) instruction selecting means responsive to said control signal from said control unit and said operation authorizing flag read out from said operation authorization storage means, for selecting one of said instruction from said control unit and said local instruction read out from said instruction storage means, and for providing the selected instruction to said arithmetic element to execute the arithmetic operation corresponding to the selected instruction.

2. A single instruction parallel computer as set forth in claim 1, wherein said instruction storage means and operation authorization storage means further comprise:
registers in a register group for temporarily storing the data to be computed by said arithmetic element and the arithmetic result of the computed data.

3. A single instruction parallel computer as set forth in claim 1, wherein said local instruction stored in said instruction storage means is generated by said arithmetic element using instruction generative data stored in said local memory.

4. A single instruction parallel computer as set forth in claim 1, wherein said instruction selecting means further comprises:

selecting means connected to receive said instruction from said control unit and said local instruction read out from said instruction storage means and to provide one of them to said arithmetic element; and
an instruction selection control unit connected to receive said operation authorizing flag read out from said operation authorization storage means and to receive said control signal from said control unit, and to provide a selection control signal to said selecting means.

5. A single instruction parallel computer comprising:
(a) a control unit for providing an instruction, a first address and a selecting signal;
(b) a plurality of arithmetic units provided on a single integrated circuit chip, each of which includes an arithmetic part and an address generating circuit for outputting one of said first address received from said control unit and a second address generated at said address generating circuit;
(c) a memory provided separately from said integrated circuit chip;
(d) address switch means for selecting and providing said second address output from said address generating circuit in one of said plurality of arithmetic units to said memory in a time-shared manner in response to said selecting signal from said control unit; and
(e) data switch means for selectively providing data read out from said memory to said arithmetic part in one of said plurality of arithmetic units, said data switch means operating synchronously with said address switch means.

6. A single instruction parallel computer as set froth in claim 5, wherein said data switch means and said address switch means are provided on said integrated circuit chip.

7. A single instruction parallel computer as set forth in claim 6, further comprising:
at least one additional integrated circuit chip identical to said single integrated circuit chip, and at least one additional memory interconnected with said at least one additional integrated circuit chip.

* * * * *